J. E. EVANS.
POULTRY PERCH.
APPLICATION FILED MAR. 5, 1919.

1,305,450.

Patented June 3, 1919.

Inventor:
J. E. Evans,
by Hazard & Miller
Attys.

UNITED STATES PATENT OFFICE.

JAMES E. EVANS, OF LOS ANGELES, CALIFORNIA.

POULTRY-PERCH.

1,305,450.  Specification of Letters Patent.  Patented June 3, 1919.

Application filed March 5, 1919. Serial No. 280,783.

*To all whom it may concern:*

Be it known that I, JAMES E. EVANS, a citizen of the United States, residing at Los Angeles, in the county of Los Angeles and State of California, have invented new and useful Improvements in Poultry-Perches, of which the following is a specification.

My invention relates to poultry perches, and consists of the novel features herein shown, described and claimed.

My object is to protect poultry perches with grease cups so that lice and vermin will not reach the perches.

Figure 1:
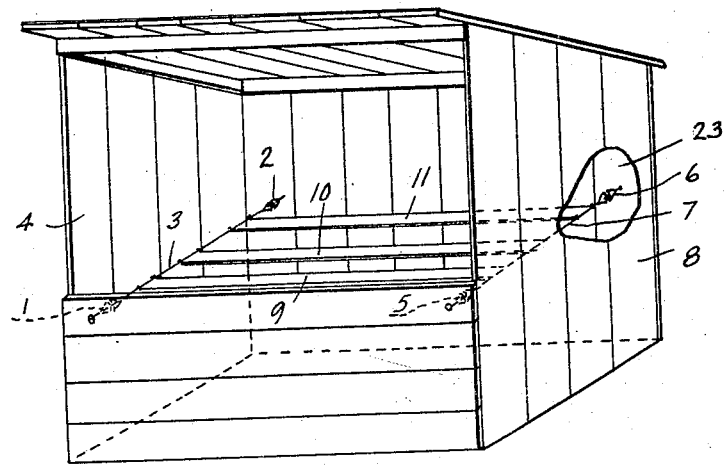
Figure 1 is a perspective of a henhouse having perches protected with grease cups in accordance with the principles of my invention.
Figure 2:
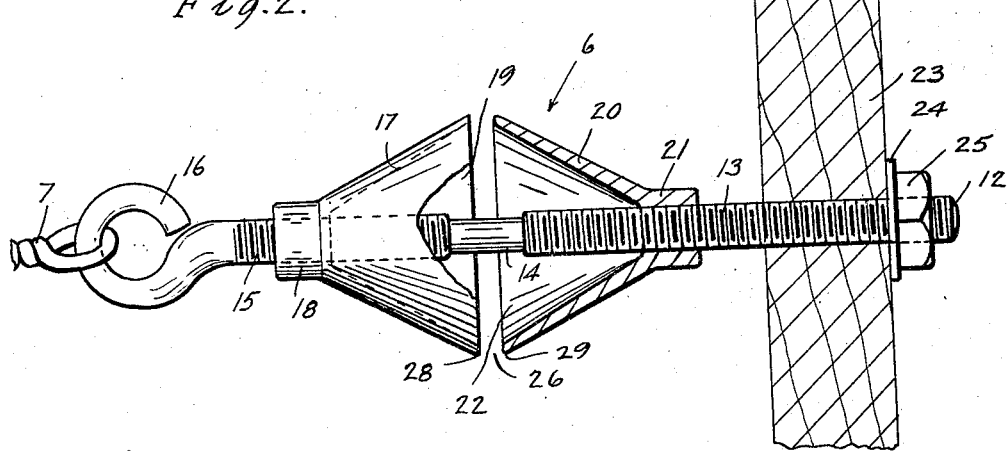
Fig. 2 is an enlarged fragmentary sectional detail of one of the grease cups.

The grease cups 1 and 2 are connected by a supporting wire 3 just inside of the wall 4 of the henhouse, and the grease cups 5 and 6 are connected by a supporting wire 7 just inside of the wall 8 of the henhouse. The perches 9, 10 and 11 are mounted upon the wires 3 and 7, so that no lice or vermin can get to the perches without passing the grease cups 1, 2, 5 and 6. The grease cups 1, 2, 5 and 6 are all alike and are constructed and operated as shown in Figs. 2 and 3.

A long bolt 12 has a screw thread 13 at one end, a reduced smooth connecting portion 14 near its center, a screw thread 15 at the opposite end of the portion 14 from the screw thread 13, and an eye 16 at the opposite end from the screw thread 13. The wires 3 or 7 are connected to the eye 16. The half grease cup 17 is funnel-shaped and has an internally screw threaded hub 18 at its bottom, the hub 18 being screwed upon the thread 15 with the open end 19 of the half cup in line with the smooth portion 14. The half cup 20 is funnel-shaped and has a hub 21 at its bottom, the hub 21 being screwed upon the thread 13 with the mouth 22 of the cup in line with the smooth portion 14. The screw threaded end 13 of the bolt 12 is inserted through the wall 23, a washer 24 is placed upon the end of the bolt 12 against the outer face of the wall 23, and a nut 25 is screwed upon the bolt against the washer. The half cups 17 and 20 are mouth to mouth and are adjustable to and from each other by rotation. Either one of the half cups may be screwed away from the other, and a gob of grease placed upon the bolt around the smooth portion 14 and smeared upon the inner faces of the half cups 17 and 20 to any desired extent, and then the cups may be adjusted to move toward each other to leave a space 26 between their adjacent edges.

Figure 3:
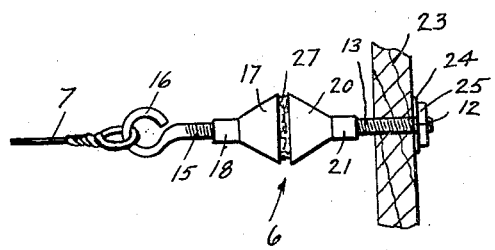
Fig. 3 is a view analogous to Fig. 2 upon a reduced scale and showing the grease in the grease cup.

If the cups are filled with grease, as in Fig. 3, the grease 27 will connect the edges 28 and 29 of the cups. In any event, it will be impossible for lice or the like to pass from the wall 23 to the wire without crossing the grease, and at the same time the grease will be within the half cups 17 and 20 so that the poultry, rats and the like cannot eat the grease.

I propose to make the grease cup construction as an article of manufacture, so that a poultry man can buy the grease cups and build the henhouse and perches.

Various changes may be made without departing from the spirit of my invention as claimed.

I claim:

As an article of manufacture a grease cup comprising a long externally screw threaded bolt having an eye at one end, a half grease cup screw seated upon the bolt, a second half grease cup screw seated upon the bolt, said cups being mounted mouth to mouth, and a nut upon the opposite end of the bolt from the eye.

In testimony whereof I have signed my name to this specification.

JAMES E. EVANS.